US012761360B2

(12) United States Patent
Zlokolica et al.

(10) Patent No.: US 12,761,360 B2
(45) Date of Patent: Oct. 13, 2026

(54) TIME-OF-FLIGHT IMAGING CIRCUITRY, TIME-OF-FLIGHT IMAGING SYSTEM, TIME-OF-FLIGHT IMAGING METHOD

(71) Applicant: Sony Semiconductor Solutions Corporation, Atsugi (JP)

(72) Inventors: Vladimir Zlokolica, Stuttgart (DE); Alex Kamovitch, Stuttgart (DE)

(73) Assignee: Sony Semiconductor Solutions Corporation, Atsugi (JP)

( * ) Notice: Subject to any disclaimer, the term of this patent is extended or adjusted under 35 U.S.C. 154(b) by 1020 days.

(21) Appl. No.: 17/781,727

(22) PCT Filed: Dec. 15, 2020

(86) PCT No.: PCT/EP2020/086280
§ 371 (c)(1),
(2) Date: Jun. 2, 2022

(87) PCT Pub. No.: WO2021/122641
PCT Pub. Date: Jun. 24, 2021

(65) Prior Publication Data

US 2023/0003894 A1 Jan. 5, 2023

(30) Foreign Application Priority Data

Dec. 16, 2019 (EP) .................................... 19216454

(51) Int. Cl.
*G01S 17/894* (2020.01)
*G01S 7/48* (2006.01)
(Continued)

(52) U.S. Cl.
CPC .......... *G01S 17/894* (2020.01); *G01S 7/4808* (2013.01); *G01S 17/48* (2013.01); *G06T 7/248* (2017.01);
(Continued)

(58) Field of Classification Search
None
See application file for complete search history.

(56) References Cited

U.S. PATENT DOCUMENTS 9,538,081 B1 1/2017 Zhou
10,122,998 B2 11/2018 van Baarsen et al.
(Continued)

FOREIGN PATENT DOCUMENTS

CN 103975250 A 8/2014
CN 107851322 A 3/2018
(Continued)

OTHER PUBLICATIONS

Wronski, Bartlomiej, et al. "Handheld multi-frame super-resolution." ACM Transactions on Graphics (ToG) 38.4 (2019): 1-18. (Year: 2019).*
(Continued)

*Primary Examiner* — Luke D Ratcliffe
(74) *Attorney, Agent, or Firm* — XSENSUS LLP

(57) ABSTRACT

The present disclosure generally pertains to a time-of-flight imaging circuitry configured to: obtain first image data from an image sensor, the first image data being indicative of a scene, which is illuminated with spotted light; determine a first image feature in the first image data; obtain second image data from the image sensor, the second image data being indicative of the scene; determine second image feature in the second image data; estimate a motion of the second image feature with respect to the first image feature; and merge the first and the second image data based on the estimated motion.

22 Claims, 5 Drawing Sheets

(51) Int. Cl.
*G01S 17/48* (2006.01)
*G06T 7/246* (2017.01)
*G06T 7/521* (2017.01)
*G06T 7/579* (2017.01)

(52) U.S. Cl.
CPC .............. *G06T 7/521* (2017.01); *G06T 7/579* (2017.01); *G06T 2207/10028* (2013.01); *G06T 2207/20221* (2013.01)

(56) References Cited

U.S. PATENT DOCUMENTS

| | | | | |
|---|---|---|---|---|
| 10,229,502 | B2 | 3/2019 | Adam et al. | |
| 2014/0178352 | A1* | 6/2014 | Mochly-Rosen | A61P 35/00 424/94.5 |
| 2016/0110878 | A1* | 4/2016 | Chang | G06T 7/20 382/103 |
| 2019/0304115 | A1 | 10/2019 | Sladkov et al. | |
| 2021/0374909 | A1 | 12/2021 | Chen | |

FOREIGN PATENT DOCUMENTS

| | | | |
|---|---|---|---|
| CN | 108470323 | A | 8/2018 |
| CN | 109712192 | A | 5/2019 |
| DE | 102016219516 | A1 | 5/2017 |
| EP | 3163316 | A1 | 5/2017 |
| EP | 3466070 | B1 | 2/2021 |
| WO | 2016/154869 | A1 | 10/2016 |
| WO | 2017/160516 | A1 | 9/2017 |

OTHER PUBLICATIONS

International Search Report and Written Opinion mailed on Dec. 15, 2020, received for PCT Application PCT/EP2020/086280 Filed on Mar. 5, 2021, 9 pages.

Wronski et al., "Handheld Multi-Frame Super-Resolution", arXiv:1905.03277v1, ACM Trans. Graph., vol. 38, No. 4, Article 28, Jul. 2019, 24 pages.

Bartlomiej Wronski, Ignacio Garcia-Dorado, Manfred Ernst, Damien Kelly, Michael Krainin, Chia-Kai Liang, Marc Levoy, and Peyman Milanfar, "Handheld Multi-Frame Super-Resolution", Jul. 2019, 24 pgs., vol. 38, No. 4, Article 28.

* cited by examiner

TIME-OF-FLIGHT IMAGING CIRCUITRY, TIME-OF-FLIGHT IMAGING SYSTEM, TIME-OF-FLIGHT IMAGING METHOD

CROSS-REFERENCE TO RELATED APPLICATIONS

The present application is based on PCT filing PCT/EP2020/086280, filed Dec. 15, 2020, and claims priority to EP Application No. 19216454.9, filed Dec. 16, 2019, the entire contents of each are incorporated herein by reference.

TECHNICAL FIELD

The present disclosure generally pertains to a time-of-flight imaging circuitry, a time-of-flight imaging system, and a time-of-flight imaging method.

TECHNICAL BACKGROUND

Generally, time-of-flight imaging systems are known. Such systems typically measure a roundtrip delay of emitted light, a phase-shift of light (which may indicate a roundtrip delay), a distortion of emitted light, or the like, for determining a depth map or a three-dimensional model of an object.

Generally, in order to measure or to image a three-dimensional object, it is desirable to have a relatively exact measurement output. However, in known systems, so called multipath artifacts, aliasing effects, and the like, may deteriorate such a measurement.

Although there exist techniques for processing time-of-flight image data, it is generally desirable to provide a time-of-flight imaging circuitry, a time-of-flight imaging system, and a time-of-flight imaging method.

SUMMARY

According to a first aspect the disclosure provides a time-of-flight imaging circuitry configured to: obtain first image data from an image sensor, the first image data being indicative of a scene, which is illuminated with spotted light; determine a first image feature in the first image data; obtain second image data from the image sensor, the second image data being indicative of the scene; determine a second image feature in the second image data; estimate a motion of the second image feature with respect to the first image feature; and merge the first and the second image data based on the estimated motion.

According to a second aspect the disclosure provides a time-of-flight imaging system, comprising: a spotted light source configured to illuminate a scene with spotted light; an image sensor; and time-of-flight imaging circuitry configured to: obtain first image data from an image sensor, the first image data being indicative of a scene, which is illuminated with spotted light; determine a first image feature in the first image data; obtain second image data from the image sensor, the second image data being indicative of the scene; determine a second image feature in the second image data; estimate a motion of the second image feature with respect to the first image feature; and merge the first and the second image data based on the estimated motion.

According to a third aspect the disclosure provides a time-of-flight imaging method, comprising: obtaining first image data from an image sensor, the first image data being indicative of a scene, which is illuminated with spotted light; determining a first image feature in the first image data; obtaining second image data from the image sensor, the second image data being indicative of the scene; determining a second image feature in the second image data; estimating a motion of the second image feature with respect to the first image feature; and merging the first and the second image data based on the estimated motion.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
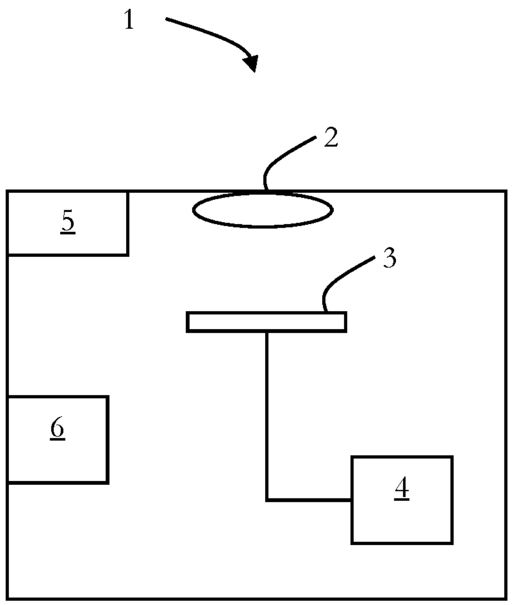
FIG. 1 depicts a block diagram of a time-of-flight imaging system according to the present disclosure.

Before a detailed description of the embodiments under reference of FIG. 1 is given, general explanations are made.

As mentioned in the outset, a measurement with a known time-of-flight system may lead to a multipath artifact, which may deteriorate the measurement, whereas it is generally desirable to decrease imaging artifacts in general.

Moreover, it is generally desirable to increase a resolution of a time-of-flight measurement, of a depth-map and/or of a three-dimensional model of an object in some instances.

It has been recognized that, in the case of spot time-of-flight, a scene may be illuminated with a limited number of light spots. Therefore, the resolution of an acquired time-of-flight image may be confined to this limited number of light spots.

It has also been recognized that the resolution may be increased by increasing the number of light spots, wherein, it is desirable to maintain a size of a light source and not increase it for increasing the number of light spots.

Thus, it has been recognized that this may be achieved by a movement or a motion of the light source between consecutive frames of the time-of-flight image acquisition, such that a wider area of the scene (and/or the object) may be illuminated.

Moreover, it has been recognized that an image quality may be improved by a movement or a motion of an image sensor. In a single time-of-flight measurement, it may, in some instances, not be possible to distinguish between the light signal which is supposed to be measured and a reflected light signal, which may have travelled a longer way. Generally, such an effect is known as a multipath-effect.

Hence, it has been recognized that an influence of a multipath effect, may be decreased by taking into account two (or more) (consecutive) measurements from different positions, which may be based on a motion of the image sensor, as indicated above.

For example, by using a set of light spots with a predetermined number, a multipath artifact may be recognized or estimated, and thereby is may be possible to remove the artifact from an obtained depth and/or from an obtained confidence value.

The multipath artifact may be recognized by taking into account at least one neighboring light spot with respect to a light spot (of the set of light spots). This may be possible since a non-continuous distribution of light (spots) may be used, in some embodiments.

In other embodiments, which may use a continuous distribution of (modulated) light (e.g. indirect time-of-flight), a motion of an imaging element (e.g. pixel) with respect to an object or a fixed position of the object may be utilized for recognizing a multipath artifact.

A continuous distribution of light may be achieved by increasing a spot density of a spotted light source, such light spots (partly) overlap. However, the present disclosure is not limited to generating a continuous distribution of light with a spotted light source, such that any light source may be utilized.

In some embodiments, a recognition of a multipath artifact results in a reduced resolution (of a single frame). However, the reduced resolution is compensated for by acquiring multiple frames and merging them (as discussed herein).

Therefore, some embodiments pertain to a time-of-flight imaging circuitry configured to: obtain first image data from an image sensor, the first image data being indicative of a scene, which is illuminated with spotted light; determine a first image feature in the first image data; obtain second image data from the image sensor, the second image data being indicative of the scene; determine a second image feature in the second image data; estimate a motion of the second image feature with respect to the first image feature; and merge the first and the second image data based on the estimated motion.

Generally, a time-of-flight imaging circuitry may include any circuitry configured to carry out, process, evaluate, perform, and the like, a time-of-flight measurement, such as a processor, e.g. a CPU (central processing unit), a GPU (graphic processing unit), an FPGA (field programmable gate array), and the like, wherein also multiple of such components, also in combination, may be envisaged. Moreover, the time-of-flight imaging circuitry may include or may be included in a computer, a server, a camera, and the like, and/or combinations thereof.

The time-of-flight imaging circuitry may be configured to obtain first image data from an image sensor.

The image sensor may generally be any known image sensor, which may include one or multiple imaging elements (e.g. pixels) and be based on a known semiconductor or diode technology, such as CMOS (complementary metal oxide semiconductor), CCD (charge coupled device), CAPD (current assisted photonic demodulator), SPAD (single photon avalanche diode), and the like.

The image sensor may be configured to generate an electric signal in response to light being incident on an image plane (e.g. on one or a plurality of pixels), as it is commonly known, wherein the electric signal may be processed and thereby, the first image data may be indicated, generated, and the like.

Moreover, the image plane may have a larger area than the image sensor. For example, the image plane may be established by a total area in which the image sensor is moved, such that the image plane may at least cover this area (or even more).

Obtaining of the first and/or the second image data may include a sending of a request to the image sensor (or to any circuitry coupled to the image sensor, such as a memory, and the like) in order to (actively) acquire the first image data, whereas, in some embodiments, the first (and/or second) image data are (passively) received by the time-of-flight imaging circuitry at a predetermined point of time. That means that obtaining may further include a reception of the first and/or the second image data in response to a request sent to the image sensor, received via a bus, from a data storage, or the like. In general, it should be noted that an active acquisition of the first image data may also include a passive reception, i.e. an (active) request may establish a passive reception of the first and/or the second image data at a predetermined point of time, and the like.

The first (and/or the second) image data may be indicative of a scene. The scene may include an object of which a depth measurement shall be (or is) performed. Moreover, the scene may include a surrounding of the object (e.g. a background), which may have a larger projected area on the image plane than the object, such that the scene may still be captured in cases in which the object is not being (fully) captured by the image sensor after a movement of the image sensor, and the like.

Generally, the scene may be illuminated with spotted light, which may originate from a spotted light source, such as a diode laser (or multiple diode lasers), VCSEL(s) (vertical-cavity surface-emitting laser), and the like, which may be configured to illuminate the scene with a plurality of light spots generated by the spotted light source. The spotted light may be based on a predefined pattern, wherein the shape and/or the arrangement of the plurality of light spots may be predefined, such that a distortion, smearing, deformation, and the like of at least one of the plurality of light spots and/or of the pattern (e.g. change of distances/arrangement of the different light spots) may be indicative of a distance or a depth between the image sensor and/or the light source to the scene.

In some embodiments, the distance between (at least) two light spots may be indicative of the object (and/or the scene) and/or a respective (relative or absolute) depth of the two light spots or may be indicative of the image feature.

Hence, a time-of-flight measurement according to the present disclosure may be performed at different lighting scenarios, e.g. in a dark lighting condition (e.g. with roughly no background light), in a bright lighting condition (e.g. in sunlight), in a room, in daylight, or the like.

Moreover, different wavelength bands (or channels) may be used in the spotted light source.

For example, the light source may emit different light colors (light having different wavelength ranges, e.g. infrared (wavelength range) and green (wavelength range)) for having a more precise feature reconstruction for features, which are more sensitive for the respective color (wavelength range). For example, human skin may have a known reflectivity for infrared light (e.g. eighty percent), whereas a flower or a plant may have a known reflectivity for green light (e.g. ninety percent), such that, in such embodiments, the light source may be configured to emit infrared light and green light, without limiting the present disclosure in that regard since any wavelength ranges may be emitted. Moreover, the present disclosure is not limited to the case of two different colors as three, four, five, or more colors may be emitted, as well.

In the first image data, a first image feature may be determined.

The first image data may be indicative of a confidence and/or a depth, as it is generally known.

For example, at least one light spot of the scene may be analyzed in the (first and/or second) image data with respect to an image property.

The image property may include a shape (of at least a part of the object and/or the scene), a pattern (of at least a part of the object and/or the scene), and the like.

Moreover, at least one spot (another spot or the same spot) may be analyzed with respect to an image condition.

The image condition may include a light intensity, a reflectance, a scattering property, and the like, of the object/ and or the scene.

In some embodiments, only an image condition (or more than one image condition) may be analyzed, whereas, in some embodiments, only an image property (or more than one image property) may be analyzed. In some embodiments, however, at least one image condition and at least one image property may be analyzed.

At least one of such image conditions and/or image properties may correspond to the first image feature or may be represented or included by the first image feature.

Hence, the first image feature may include (or be based on) at least one image condition and/or at least one image property.

Moreover, the first image feature may be recognized, based on at least one image condition and/or at least one image property, for example by an artificial intelligence, an artificial neural network, which may utilize one or more machine learning algorithms for determining the first image feature, and the like.

Furthermore, the time-of-flight imaging circuitry may obtain second image data, which may be generated in a similar way as the first image data, without limiting the present disclosure in that regard.

In the second image data, a second image feature may be determined. The determination of the second image feature may be carried out in a similar way as the determination of the first image feature, without limiting the present disclosure in that regard. The second image feature may correspond to the first image feature, such that it may include the same image feature, wherein, in some embodiments, the second image feature may include the first image feature being imaged or measured from a different perspective, e.g. after a movement of the image sensor.

However, in some embodiments, the second image feature may differ from the first image feature. For example, in response to or during an (intentional (e.g. controlled) or unintentional (e.g. a shaking of a hand)) movement of the image sensor, the second image feature may be determined to be projected to or recognized in the same (group of) pixel(s) as the first image feature before the movement.

However, the second image feature may, in some embodiments, differ from the first image feature in that it may be recognized based on a different set of image conditions or image properties or in that particular values or magnitudes of the set of image conditions may differ from the values or magnitudes of the first image feature.

For example, if the second image feature is a different pattern of the object than the first image feature, it may be indicative that a different part of the object is being imaged. This part may have not been imaged in the first image data at all or may have been imaged with a different group of pixels.

In the first case (not imaged), a resolution of a resulting image may be increased. In the second case (different group of pixels), a multipath effect may be filtered.

However, in some embodiments, a multipath effect may be ignored, since, e.g. it is small, or may have already been filtered (as discussed above).

Moreover, a correspondence between the first and the second image feature (or a set of points which may be indicated by the first and/or the second image feature) may be recognized. For example, the first image feature may be indicative of a reference set of points and the second image feature may be indicative for second a set of points which is compared to the reference set of points.

Furthermore, the recognized correspondence may be used to merge at least two frames with each other based on the recognized correspondence.

Thereby, an image quality (e.g. resolution) may be increased.

Such a recognizing of a correspondence and/or a merging may be repeated iteratively, in some embodiments, for maximizing an image quality.

Based on the second image feature, a motion of the second image feature with respect to the first feature may be estimated.

For example, a position of the first and the second image feature may be determined. The respective positions may include positions on the image plane, on the image sensor, within the scene, and the like. The different positions may then be compared, such that a motion of the second image feature with respect to the first image feature may be estimated or determined.

Based on the estimated motion, the first and the second image data may be merged. Thereby, merged image data may be generated which may include the first and the second image feature and/or the respective positions of the first and the second image feature.

The merging may include a combination of the first and the second image data taking into account the estimated motion and the first and/or the second image feature. Thus, the merged image data (or an image based on the merged image data) may have an increased resolution compared to the first and the second image data and may have a reduced number of imaging artifacts (e.g. multipath artifact).

In some embodiments, the motion is based on a vibration of at least one of the image sensor and a light source generating the spotted light.

A vibration may be a movement caused by a vibration device, such as an eccentric motor, a linear resonant actuator, and the like, as it is generally known, such that a motion, a displacement, and the like, of the image sensor and/or the light source is caused, as it is discussed herein, for determining the first and the second image feature.

It should be noted that a motion or a movement is not limited to be caused by or based on a vibration, since a time-of-flight imaging circuitry may process first image data and second image data based on any kind of movement (or even no movement).

For example, the movement may be caused by an (unintentional) shaking of a hand, a motion of a vehicle, which may cause a (random) movement, a vibration caused by a motor of the vehicle, and the like (in embodiments in which a time-of-flight imaging circuitry is provided in the vehicle).

Moreover, a motion or movement may include a controlled (slow) movement onto a predetermined position, wherein an amplitude of such a controlled movement may typically be larger than of a vibration.

Moreover, a (spotted) light source may be adapted to illuminate the object (or the scene) in a manner that with each illumination cycle, a different part of the object (or the scene) may be illuminated. Thereby, a movement may be simulated.

In some embodiments, the time-of-flight imaging circuitry is further configured to carry out a triangulation including the first image feature and the second image feature for estimating the motion and/or a depth.

The triangulation may include a known distance, e.g. a reference point for further specifying the position of the second image feature, and the like.

Moreover, a triangulation may be utilized to determine a further image feature or a position of a further image feature taking into account the respective positions of the first and the second image feature.

In some embodiments, as discussed above, a reference set of points and a second set of points may be acquired, and a correspondence may be recognized. Based on the recognized correspondence, and essential or fundamental matrix may be determined, which may be indicative for a rotation and a translation between the reference set of points of the second set of points, and, thereby between the first and the second image feature.

Based on the rotation and translation, a triangulation may be performed and a depth of the second image feature may be determined, which may be compared to a depth of the first image. In a case in which the comparison of the respective depths is below a predetermined threshold, and the determined rotation and translation may be assumed to have a predetermined accuracy.

If the predetermined accuracy is reached, a first and a second frame (including the first and the second image feature) may be merged (e.g. blended) taking into account the translation and rotation (e.g. for correcting a movement distortion), whereby a resolution may be increased.

In some embodiments, the triangulation may be based on a disparity of a determined depth of the second image feature compared to the first image feature, as discussed above. The disparity may be defined as one over the depth. Thus, the difference (disparity) of the positions of the second image feature and the first image feature may be expressed as: $x_2$-$x_1$=(1/depth), $x_1$ including a position of the first image feature, and $x_2$ including a position of the second image feature. Assuming that the first and the second image feature correspond (to each other), and the depth is assumed constant, the position of, for example, the first image feature may be determined.

In some embodiments, the time-of-flight imaging circuitry is further configured to match the first image feature and the second image feature.

The matching, as indicated above, may be performed, if the first and the second image feature are the same, but shifted by a displacement caused by a motion.

The matching may be performed based on the second image feature having the same (or similar, e.g. below a predetermined threshold) image condition or image property as the first image feature.

For example, the second image feature may be matched with the first image feature when the light intensity of the second image feature is within a predetermined threshold to the light intensity of the first image feature.

In some embodiments, the time-of-flight imaging circuitry is further configured to determine a first depth based on the match.

Since the first and the second image feature may correspond to each other, but their position may be based on a displacement, as described herein, the respective features may be symbolically expressed in different (local) coordinate systems.

Based on such coordinate systems, a more precise depth or distance determination may be possible (more precise than with only one time-of-flight measurement as known in the art), such that, based on the match, the distance may be determined, for example by taking a (weighted) mean of the distance of the first image feature and a distance of the second image feature.

Moreover, the first distance may be determined in a global coordinate system or an image sensor coordinate system taking into account the two (or at least two) local coordinate systems and the respective positions of the first and the second image feature.

In some embodiments, the time-of-flight imaging circuitry is further configured to determine at least one third image feature based on third image data indicating a second depth.

The third image feature may be a further image feature being different from the first and/or the second image feature, which may be for example a different feature, pattern, and the like, (and thus may be indicated by a different imaging condition and/or imaging property) of the object. The third image feature may have a second depth.

It should be noted that the second depth may generally be (roughly) the same depth as the first depth, but as indicated, may be found at a different position of the object and/or of the scene.

In some embodiments, the time-of-flight circuitry is further configured to determine a third depth based on the first and the second depth.

The third depth may be determined based on a processing of the first and the second depth, and therefore, it may not be necessary to perform a further time-of-flight measurement, such that the third depth may indicate a further or fourth (virtual) image feature, which may be determined, in some embodiments, by an interpolation including the first and the second depth.

In some embodiments, the time-of-flight imaging circuitry is further configured to temporally align the first and the second image data based on the estimated motion.

Since the estimated motion may be expressible in a velocity, a celerity, a speed, and the like, but may (symbolically) be depicted or interpreted as a vector between the first and the second image feature, wherein a time between the determination (or acquisition) of the first and the second image feature may be known, the first and the second image data may, thus, be temporally aligned, thereby simplifying the resulting image (or depth measurement) and increasing a precision of the measurement.

Some embodiments pertain to a time-of-flight imaging system including: a spotted light source configured to illuminate a scene with spotted light; an image sensor; and time-of-flight imaging circuitry configured to: obtain first image data from an image sensor, the first image data being indicative of a scene, which is illuminated with spotted light; determine a first image feature in the first image data; obtain second image data from the image sensor, the second image data being indicative of the scene; determine a second image feature in the second image data; estimate a motion of the second image feature with respect to the first image feature; and merge the first and the second image data based on the estimated motion, as described herein.

Generally, the time-of-flight imaging system may include further elements, such as a lens (stack), and the like, as they are generally known, and therefore, a description of such known components is omitted.

The elements of the time-of-flight imaging system (spotted light source, image sensor, time-of-flight imaging circuitry, and the like) may be distributed in several subsystems, or may be provided in an integrated system, such as a time-of-flight camera, a mobile phone, a car, and the like.

For example, if the time-of-flight imaging system is a mobile phone, such that an application of the time-of-flight imaging system may be considered as a three-dimensional scanning, registration and/or recognition of an object, a time-of-flight acquisition may be performed within a predetermined distance between the mobile phone and the object.

The mobile phone may provide a trigger (e.g. a virtual or real button) for starting a three-dimensional acquisition. In response to the trigger, a vibration of the mobile phone may be initiated. The vibration may last until a frame of the time-of-flight measurement is acquired (or extracted) (e.g. for ten seconds). During such an acquisition period, a time-of-flight imaging method (as described below) may be performed.

Moreover, in some embodiments, a further acquisition may be initiated from a different angle (or from a different perspective) with respect to the object.

Thereby, a three-dimensional model of the object including a mesh, a shading and/or a texture, and the like may be generated.

However, the present disclosure is not limited to multiple acquisitions, such that the time-of-flight imaging method (discussed below) may be based on one acquisition (one shot), as well, for example for a recognition, a face authentication, and the like.

In some embodiments, the time-of-flight imaging system further includes a vibration device configured to generate a vibration of the time-of-flight imaging system, wherein the vibration is indicative of the motion of the second image feature with respect to the first image feature, as discussed herein.

The vibration device, as discussed above, may include an eccentric motor, a linear resonant actuator, and the like.

Some embodiments pertain to a time-of-flight imaging method, including: obtaining first image data from an image sensor, the first image data being indicative of a scene, which is illuminated with spotted light; determining a first image feature in the first image data; obtaining second image data from the image sensor, the second image data being indicative of the scene; determining a second image feature in the second image data; estimating a motion of the second image feature with respect to the first image feature; and merging the first and the second image data based on the estimated motion, as discussed herein.

The time-of-flight imaging method according to the present disclosure may be executed by a time-of-flight imaging circuitry according to the present disclosure, a time-of-flight system according to the present disclosure, and the like.

In some embodiments, the motion is based on a vibration of at least one of the image sensor and a light source generating the spotted light, as discussed herein. In some embodiments, the time-of-flight method further includes carrying out a triangulation including the first image feature and the second image feature for estimating the motion, as discussed herein. In some embodiments, the time-of-flight method further includes matching the first image feature and the second image feature, as discussed herein. In some embodiments, the time-of-flight method further includes determining a first depth based on the match, as discussed herein. In some embodiments, the time-of-flight method further includes determining at least one third image feature based on third image data indicating a second depth, as discussed herein. In some embodiments, the time-of-flight method further includes determining a third depth based on the first and the second depth, as discussed herein. In some embodiments, the third depth is based on an interpolation including the first and the second depth, as discussed herein. In some embodiments, the time-of-flight method further includes temporally aligning the first and the second image data based on the estimated motion, as discussed herein.

The method(s) as described herein are also implemented in some embodiments as a computer program causing a computer and/or a processor to perform the method, when being carried out on the computer and/or processor. In some embodiments, also a non-transitory computer-readable recording medium is provided which stores therein a computer program product, which, when executed by a processor, such as the processor described above, causes the methods described herein to be performed.

Returning to FIG. 1, there is depicted block diagram of a time-of-flight imaging system 1 according to the present disclosure.

The time-of-flight imaging system 1 has a lens stack 2 which is configured to focus light onto an image sensor 3, as it is discussed herein.

Moreover, a time-of-flight imaging circuitry 4, as it is discussed herein, may obtain (first and second) image data from the image sensor 3, determine a first and a second image feature, estimate a motion of the second image feature with respect to the first image feature, and merge the first and the second image data based on the estimated motion, as discussed herein.

The time-of-flight imaging system 1 further includes a spotted light source 5 and a vibration device 6, as discussed herein.

Figure 2:
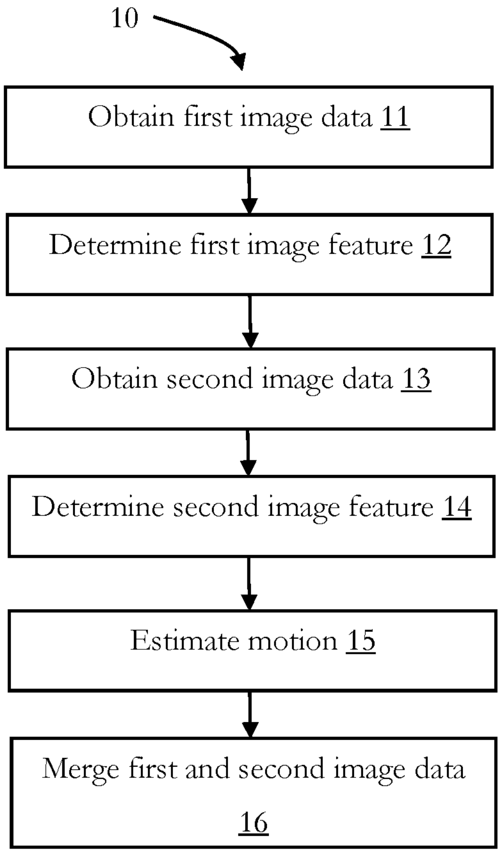
FIG. 2 depicts a block diagram of a time-of-flight imaging method according to the present disclosure.

FIG. 2 depicts a block diagram of a time-of-flight imaging method 10 according to the present disclosure.

In 11, first image data are obtained from an image sensor, wherein the first image data are indicative of a scene, which is illuminated with spotted light, as discussed herein. In this embodiment, a time-of-flight imaging circuitry, which is configured to carry out the time-of-flight imaging method 10, is connected to the image sensor via a bus, such that the image sensor transmits the first image data to the time-of-flight imaging circuitry.

In 12, a first image feature is determined in the first image data by a pattern recognition algorithm implemented in the time-of-flight imaging circuitry.

In 13, second image data are obtained from the image sensor via the bus.

In 14, a second image feature is determined in the second image data by the pattern recognition algorithm, as discussed herein.

In 15, a motion of the second image feature is estimated with respect to the first image feature by comparing a position of the second image feature with respect to the first image feature.

In 16, the first and the second image data are merged based on the estimated motion, as discussed herein.

Figure 3:
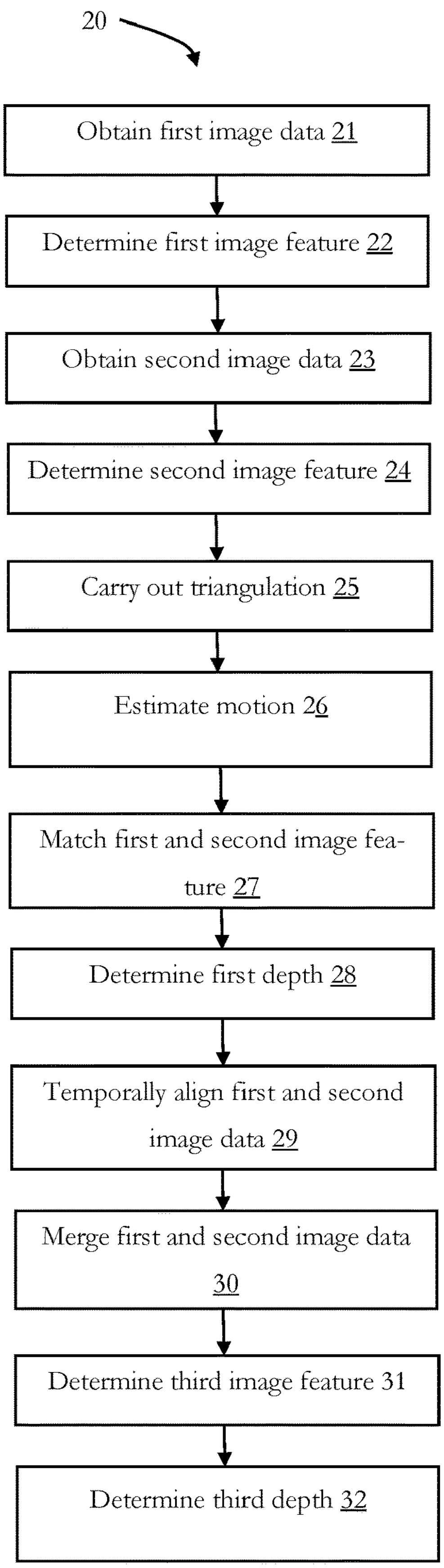
FIG. 3 depicts a block diagram of a further embodiment of a time-of-flight imaging method according to the present disclosure.

FIG. 3 depicts, in a block diagram, a further embodiment of a time-of-flight imaging method 20 according to the present disclosure.

The time-of-flight imaging method 20 differs from the time-of-flight imaging method 10, which is described with respect to FIG. 2 in that a motion is detected based on a triangulation, that the first and the second image data are temporally aligned and that a third image feature is determined based the first and the second depth.

In this embodiment, the motion is determined based on confidence data, which is generally known in the field of time-of-flight. Based on the confidence data, the triangulation is performed for determining a depth.

In 21, first image data are obtained from an image sensor, wherein the first image data are indicative of a scene, which is illuminated with spotted light, as discussed herein. In this embodiment, the image sensor and a time-of-flight imaging circuitry carrying out the time-of-flight imaging method 20 are connected via a bus through which the image sensor transmits the first image data.

In 22, a first image feature is determined in the first image data by a pattern recognition algorithm implemented in the time-of-flight imaging circuitry.

In 23, second image data are obtained from the image sensor via the bus.

In 24, a second image feature is determined in the second image data by the pattern recognition algorithm.

In 25, a triangulation including the first image feature and the second image feature is carried out. That is, based on a reference point and a position of the first image feature, a position of the second image feature is determined.

In 26, a motion of the second image feature is estimated with respect to the first image feature, based on the triangulation.

In 27, the first image feature and the second image feature are matched. That is, based on the motion, the respective positions of the first and the second image feature are transformed into a global coordinate system.

In 28, a first depth is determined based on the match, since a multipath effect is excluded in 27 by transforming the first and the second image feature into the global coordinate system.

In 29, the first and the second image data are temporally aligned based on the motion, as discussed herein.

In 30, the first and the second image data are merged based on the estimated motion, such that resulting merged image data have the determined depth based on one point of the global coordinate system.

In 31, at least one third image feature is determined based on third image data indicating a second depth. The third image feature is determined as the first and/or the second image feature. However, the third image feature is at a different position of the object and is, therefore, distinct from the first and the second image feature.

In 32, a third depth is determined based on the first and the second depth with an interpolation between the first and the second depth.

Figure 4:
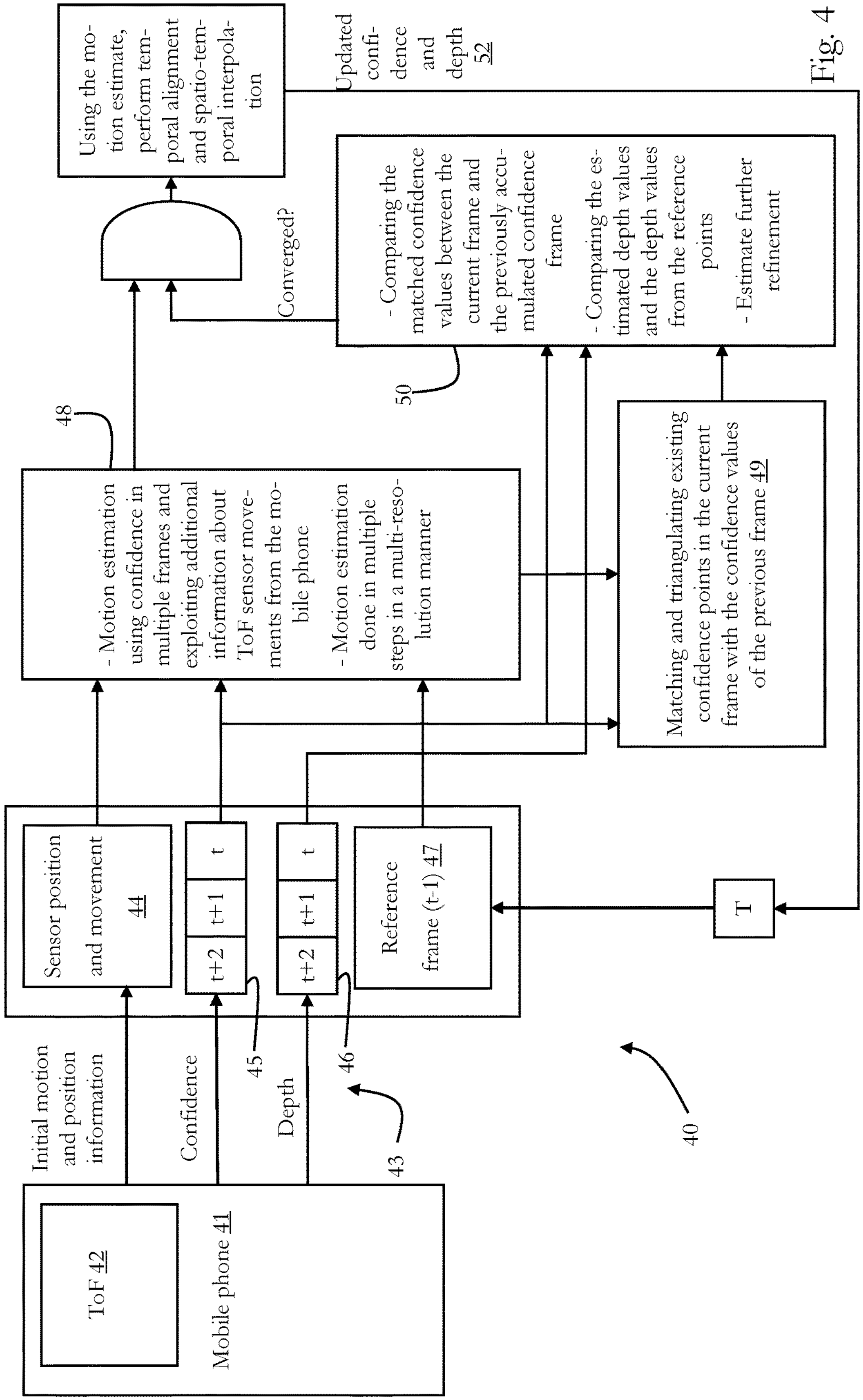
FIG. 4 depicts a further embodiment of a time-of-flight imaging method according to the present disclosure.

FIG. 4 depicts a time-of-flight imaging method 40 according to the present disclosure. The time-of-flight imaging method 40 differs from the previous embodiments of the time-of-flight imaging methods 20 in that it is performed by a mobile phone including a vibration device.

A mobile phone 41 includes a time-of-flight imaging system 42. It should be noted that, in this embodiment, a vibration device is not included in the time-of-flight imaging system 42, but in the mobile phone 41, such that the time-of-flight imaging system 42 undergoes a motion when the mobile phone 41 vibrates.

From the mobile phone 41 (and the time-of-flight imaging system 42), initial motion and position information, confidence data, and depth data, as it is generally known and described herein, are determined in 43.

Based on the initial motion and position information, which serve as a reference point in a global coordinate system (as discussed above), a further position of a time-of-flight image sensor of the time-of-flight imaging system 42 is determined in 44.

Moreover, for a plurality of confidence sub-frames 45, which are acquired consecutively at points of time t, t+1, and t+2, confidence values of the time-of-flight measurement are determined. For a plurality of depth sub-frames 46, which are acquired consecutively at roughly the points of time t, t+1, and t+2, depth values are determined.

Based on the sensor position and movement, as well as the confidence values and a reference frame 47 of a previous measurement at the point of time t−1, a motion estimation is performed in 48.

Furthermore, the confidence values, which are determined based on the confidence sub-frames 45 at the points of time t, t+1, and t+2, and confidence values of the reference frame are matched and triangulated in 49.

In 50, the matched confidence values are compared with a confidence value of the reference frame. Moreover, the depth values of the depth sub-frames 46 are compared with a depth value from the reference frame. On the basis of these comparisons, a further refinement of the measurement is performed.

If the comparison in 50 is such that the confidence values and the depth values of the confidence sub-frames 45 and the depth sub-frames 46 converge with the confidence value and the depth value of the reference frame, in 51, each confidence value and depth value of the sub-frames 45 and 46 is associated with the estimated motion, and based on this association, a temporal alignment and spatio-temporal (after the temporal alignment and after a determination of a second depth, as discussed above) interpolation between determined confidence values and depth values is performed, as discussed herein.

The sub-frames 45 and 46 are processed to become a confidence frame and a depth frame, which then serve (together) as a reference frame T for a subsequent measurement, which is shown in 52.

Figure 5:
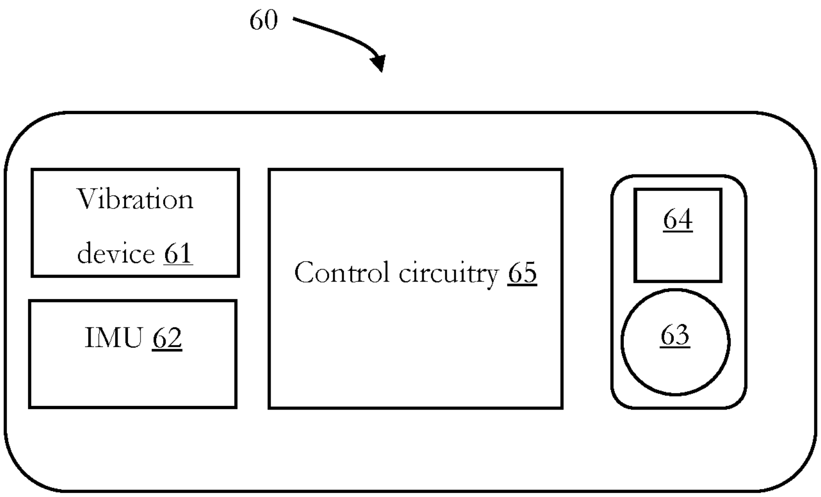
FIG. 5 depicts a block diagram of a mobile phone according to the present disclosure.

FIG. 5 depicts a block diagram of a mobile phone 60 (as a time-of-flight imaging system) including a vibration device 61, an inertial measurement unit (IMU) 62, a spot light source 63, a time-of-flight image sensor 64, and control circuitry 65 for controlling a vibration, for controlling a timing of the spot light source 63 and/or for controlling the time-of-flight image sensor 64. Moreover, the control circuitry 65 is adapted as a time-of-flight imaging circuitry according to the present disclosure.

The spot light source 63 is a dot projector which is configured to project a grid of small infrared dots (or spots) onto an object (or a scene, as discussed above) and is, in this embodiment including a plurality of VCSELs (vertical-cavity surface-emitting laser) for projecting the grid.

With such a configuration, a three-dimensional scanning and registration of the object may be achieved, wherein a multipath effect is minimized, and wherein a geometrical photometrical (luminance) resolution is achieved.

Thereby, an object recognition (e.g. face recognition) may be carried out efficiently.

Figure 6:
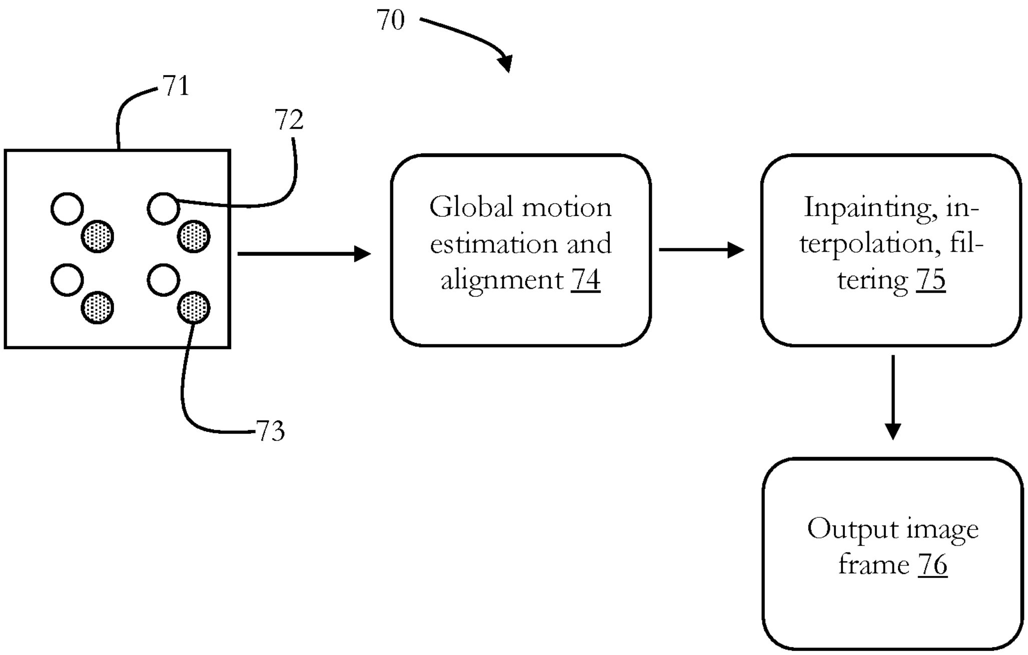
FIG. 6 depicts a block diagram of a further embodiment of a time-of-flight imaging method according to the present disclosure.

FIG. 6 depicts a block diagram of a further embodiment of a time-of-flight imaging method 70.

In 71, there is shown an image plane (e.g. of an image sensor) including a plurality of first image features 72 based on first image data and a plurality of second image features 73 based on second image data. The first and second image features 72 and 73 correspond to light spots, which are projected from a light source onto an object, wherein the light spots are captured by the image sensor and analyzed by a time-of-flight imaging circuitry, whereby the first and the second image features 72 and 73 are recognized.

Thus, the first and second image features 72 and 73 of the light spots due to a motion of the light source based on a vibration, as discussed herein.

In 74, based on the first and second image features 72 and 73, a global motion estimation of the second image features 73 with respect to the first image features 72 is performed and the second image features are aligned on the image plane 71 based on the estimated motion.

In 75, inpainting, interpolation, and filtering is performed for increasing a resolution and for filtering artifacts.

In 76, an image frame is output.

The output image frame is then used as a reference image frame for a consecutive measurement, as discussed above.

Figure 7:
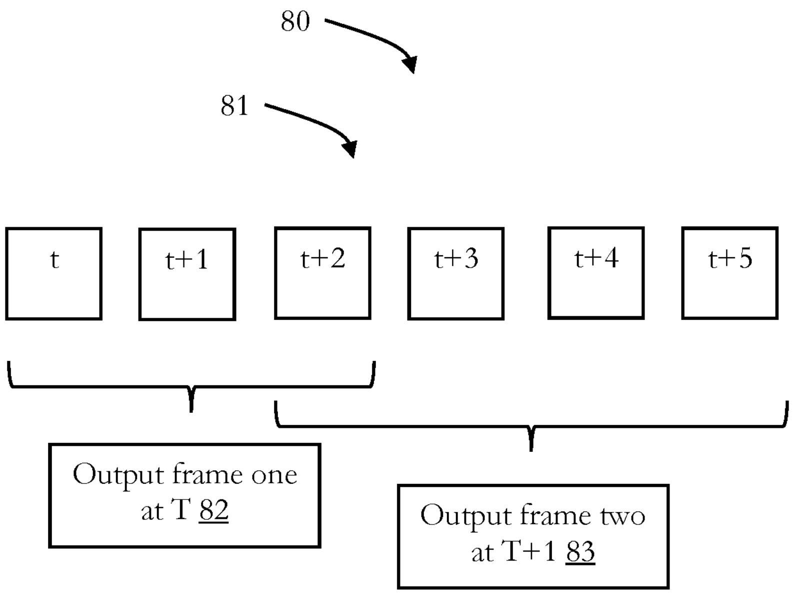
FIG. 7 depicts a method for using a reference frame.

FIG. 7 shows a method 80 for using a reference frame.

There is shown a plurality of sub-frames 81 acquired at points of time t to t+5.

For a first image frame, the first three sub-frames (t, t+1, and t+2) are taken into account, such that at a first output time T the first image frame (frame one) is output. For a second image frame, the third to sixth sub-frames (t+2, t+3, t+4, t+5) are taken into account, such that at a second output time T+1 the second image frame (frame two) is output taking frame one as a reference frame.

It should be recognized that the embodiments describe methods with an exemplary ordering of method steps. The specific ordering of method steps is however given for illustrative purposes only and should not be construed as binding. For example, the ordering of 11 and 13 in the embodiment of FIG. 2 may be exchanged. Also, the ordering of 12 and 14 in the embodiment of FIG. 2 may be exchanged. Further, also the ordering of 29 and 31 in the embodiment of FIG. 3 may be exchanged. Other changes of the ordering of method steps may be apparent to the skilled person.

Please note that the division of the time-of-flight imaging system 60 into units 62 and 65 is only made for illustration purposes and that the present disclosure is not limited to any specific division of functions in specific units. For instance, the control circuitry 65 and the IMU 62 could be implemented by a respective programmed processor, field programmable gate array (FPGA) and the like.

The methods can also be implemented as a computer program causing a computer and/or a processor, such as a time-of-flight imaging circuitry 4 discussed above, to perform the methods, when being carried out on the computer and/or processor. In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A time-of-flight imaging circuitry configured to:
obtain first image data from an image sensor, the first image data being indicative of a scene, which is illuminated with spotted light;
determine a first image feature in the first image data;
obtain second image data from the image sensor, the second image data being indicative of the scene;
determine a second image feature in the second image data;
estimate a motion of the second image feature with respect to the first image feature; and
merge the first and the second image data based on the estimated motion.

(2) The time-of-flight imaging circuitry of (1), wherein the motion is based on a vibration of at least one of the image sensor and a light source generating the spotted light.

(3) The time-of-flight imaging circuitry of anyone of (1) and (2), further configured to carry out a triangulation including the first image feature and the second image feature for estimating the motion.

(4) The time-of-flight imaging circuitry of anyone of (1) to (3), further configured to match the first image feature and the second image feature.

(5) The time-of-flight imaging circuitry of anyone of (1) to (4), further configured to determine a first depth based on the match.

(6) The time-of-flight imaging circuitry of (5), further configured to determine at least one third image feature based on third image data indicating a second depth.

(7) The time-of-flight imaging circuitry of (6), further configured to determine a third depth based on the first and the second depth.

(8) The time-of-flight imaging circuitry of (7), wherein the determination of the third depth is based on an interpolation including the first and the second depth.

(9) The time-of-flight imaging circuitry of anyone of (1) to (8), further configured to temporally align the first and the second image data based on the estimated motion.

(10) A time-of-flight imaging system, comprising:
a spotted light source configured to illuminate a scene with spotted light;
an image sensor; and
time-of-flight imaging circuitry configured to:
obtain first image data from an image sensor, the first image data being indicative of a scene, which is illuminated with spotted light;
determine a first image feature in the first image data;
obtain second image data from the image sensor, the second image data being indicative of the scene;
determine a second image feature in the second image data;
estimate a motion of the second image feature with respect to the first image feature; and
merge the first and the second image data based on the estimated motion.

(11) The time-of-flight imaging system of (10), further comprising a vibration device configured to generate a vibration of the time-of-flight imaging system, wherein the vibration is indicative of the motion of the second image feature with respect to the first image feature.

(12) A time-of-flight imaging method, comprising:
obtaining first image data from an image sensor, the first image data being indicative of a scene, which is illuminated with spotted light;
determining a first image feature in the first image data;
obtaining second image data from the image sensor, the second image data being indicative of the scene;
determining a second image feature in the second image data;
estimating a motion of the second image feature with respect to the first image feature; and
merging the first and the second image data based on the estimated motion.

(13) The time-of-flight imaging method of (12), wherein the motion is based on a vibration of at least one of the image sensor and a light source generating the spotted light.

(14) The time-of-flight imaging method of anyone of (12) and (13), further comprising:
carrying out a triangulation including the first image feature and the second image feature for estimating the motion.

(15) The time-of-flight imaging method of anyone of (12) to (14), further comprising:
matching the first image feature and the second image feature.

(16) The time-of-flight imaging method of (15), further comprising:
determining a first depth based on the match.

(17) The time-of-flight imaging method of (16), further comprising:
determining at least one third image feature based on third image data indicating a second depth.

(18) The time-of-flight imaging method of (17), further comprising:
determining a third depth based on the first and the second depth.

(19) The time-of-flight imaging method of (18), wherein the third depth is based on an interpolation including the first and the second depth.

(20) The time-of-flight imaging method of anyone of (12) to (19), further comprising:
temporally aligning the first and the second image data based on the estimated motion.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The invention claimed is:

1. Imaging circuitry configured to:
obtain first image data from an image sensor, the first image data being indicative of a scene;
determine a first image feature in the first image data, the first image feature having a first depth;
obtain second image data from the image sensor, the second image data being indicative of the scene;
determine a second image feature in the second image data;
estimate a motion of the second image feature with respect to the first image feature;
validate the estimated motion by comparing the first depth with a second depth of the second image feature that is determined based on the estimated motion; and
merge the first and the second image data conditioned on the estimated motion being validated as accurate based on the comparison.

2. The imaging circuitry of claim 1, wherein the motion is based on a vibration of at least part of the imaging circuitry.

3. The imaging circuitry of claim 1, further configured to carry out a triangulation including the first image feature and the second image feature for estimating the motion.

4. The imaging circuitry of claim 1, further configured to match the first image feature and the second image feature.

5. The imaging circuitry of claim 4, further configured to determine a first depth based on the match.

6. The imaging circuitry of claim 5, further configured to determine at least one third image feature based on third image data indicating a second depth.

7. The imaging circuitry of claim 6, further configured to determine a third depth based on the first and the second depth.

8. The imaging circuitry of claim 1, further configured to temporally align the first and the second image data based on the estimated motion.

9. The imaging circuitry of claim 1, the circuitry is configured to increase, from the merged first and second image data, the resolution of depth data associated with the first or second image data.

10. The imaging circuitry of claim 1, wherein the first image data and second image data are captured at consecutive frames.

11. An imaging system, comprising:
time-of-flight imaging circuitry configured to:
obtain first image data from an image sensor, the first image data being indicative of a scene, which is illuminated by a light source of the time-of flight imaging circuitry;
determine a first image feature in the first image data, the first image feature having a first depth;
obtain second image data from the image sensor, the second image data being indicative of the scene;
determine a second image feature in the second image data;
estimate a motion of the second image feature with respect to the first image feature;
validate the estimated motion by comparing the first depth with a second depth of the second image feature that is determined based on the estimated motion; and
merge the first and the second image data conditioned on the estimated motion being validated as accurate based on the comparison.

12. The imaging system of claim 11, further comprising a vibration device configured to generate a vibration of at least part of the time-of-flight imaging system, wherein the vibration is indicative of the motion of the second image feature with respect to the first image feature.

13. An imaging method, comprising:
obtaining first image data from an image sensor, the first image data being indicative of a scene;
determining a first image feature in the first image data, the first image feature having a first depth;
obtaining second image data from the image sensor, the second image data being indicative of the scene;
determining a second image feature in the second image data;

estimating a motion of the second image feature with respect to the first image feature;

validating the estimated motion by comparing the first depth with a second depth of the second image feature that is determined based on the estimated motion; and merging the first and the second image data conditioned on the estimated motion being validated as accurate based on the comparison.

14. The imaging method of claim 13, wherein the motion is based on a vibration of at least part of the imaging circuitry.

15. The imaging method of claim 13, further comprising: carrying out a triangulation including the first image feature and the second image feature for estimating the motion.

16. The imaging method of claim 13, further comprising: matching the first image feature and the second image feature.

17. The time-of-flight imaging method of claim 16, further comprising:

determining a first depth based on the match.

18. The time-of-flight imaging method of claim 17, further comprising:

determining at least one third image feature based on third image data indicating a second depth.

19. The time-of-flight imaging method of claim 18, further comprising:

determining a third depth based on the first and the second depth.

20. The imaging method of claim 13, further comprising: temporally aligning the first and the second image data based on the estimated motion.

21. The imaging method of claim 13, further comprising to increasing, from the merged first and second image data, the resolution of depth data associated with the first or second image data.

22. The imaging method of claim 13, wherein the first image data and second image data are captured at consecutive frames.

* * * * *